US012639349B2

(12) United States Patent
Aqeel et al.

(10) Patent No.: US 12,639,349 B2
(45) Date of Patent: May 26, 2026

(54) METHOD AND SYSTEM FOR METADATA EXTRACTION FOR DOCUMENT IDENTIFICATION

(71) Applicant: SAUDI ARABIAN OIL COMPANY, Dhahran (SA)

(72) Inventors: Hydar A. Aqeel, Dhahran (SA); Hasan M. Asfoor, Dhahran (SA); Mario A. Dourado, Dhahran (SA); Dalal A. Alharbi, Dhahran (SA); Parwez P. Kothwaal Sheik, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 65 days.

(21) Appl. No.: 18/744,771

(22) Filed: Jun. 17, 2024

(65) Prior Publication Data

US 2025/0384065 A1     Dec. 18, 2025

(51) Int. Cl.
    *G06F 16/3332*     (2025.01)
    *G06F 16/383*      (2019.01)
    *G06F 16/387*      (2019.01)

(52) U.S. Cl.
    CPC ........ *G06F 16/3334* (2019.01); *G06F 16/383* (2019.01); *G06F 16/387* (2019.01)

(58) Field of Classification Search
    None
    See application file for complete search history.

(56) References Cited

U.S. PATENT DOCUMENTS 8,843,815 B2     9/2014  Yang et al.
11,435,499 B1 *  9/2022  Peredriy ................. E21B 49/00
                (Continued)

FOREIGN PATENT DOCUMENTS

CN        117271627 A     12/2023
WO      2022197420 A1      9/2022

OTHER PUBLICATIONS

Caso, Carlo, et al., "Search and Contextualization of Unstructured Data: Examples from the Norwegian Continental Shelf," Society of Petroleum Engineers, SPE-200750-MS, 2020 (6 pages).
(Continued)

*Primary Examiner* — Thu N Nguyen
(74) *Attorney, Agent, or Firm* — Osha Bergman Watanabe & Burton LLP

(57) ABSTRACT

A method includes obtaining a document comprising earth property data regarding a geological region of interest, preprocessing the document to form at least one preprocessed document and determining, using a set of trained machine-learned models processing the at least one preprocessed document, a category of the document and a type of the document. The method further includes determining, using a natural language processing algorithm, metadata attributes of the document and a title of the document, and updating a database storing the document with the title, the category, the type and the metadata attributes. The method further includes identifying, by a planning module processing a query, the document from the database based on at least one of the title, the category, the type and the metadata attributes and planning a wellbore path in the geological region of interest using the earth property data comprised in the document.

18 Claims, 8 Drawing Sheets

(56) References Cited

U.S. PATENT DOCUMENTS

| | | | | |
|---|---|---|---|---|
| 2012/0030014 A1* | 2/2012 | Brunsman | .......... | G06Q 30/0251 |
| | | | | 705/14.49 |
| 2021/0233008 A1* | 7/2021 | Gupta | .................... | G06Q 50/02 |
| 2023/0402065 A1* | 12/2023 | Gu | ........................ | G11B 27/34 |
| 2024/0411042 A1* | 12/2024 | Bolshakov | ............... | G01V 1/50 |
| 2025/0270921 A1* | 8/2025 | Han | ........................ | E21B 47/06 |
| 2025/0284022 A1* | 9/2025 | Sun | ......................... | G01V 3/38 |

OTHER PUBLICATIONS

Asfoor, Hasan, et al., "Applying Data Science Techniques to Improve Information Discovery in Oil And Gas Unstructured Data," International Petroleum Conference, IPTC-20236-Abstract, 2020 (9 pages).
Wang, Xiaohong, et al., "Semantic Mediation of Metadata for Marine Geochemical Data Integration," ACM, 2016, DOI: http://dx.doi.org/10.1145/2925995.2926025 (5 pages).
Brazier, Pearl, et al., "Geo-Seed: A Metadata Repository for Geosciences Web Service Discovery," IEEE Computer Society, 2009 (4 pages).

* cited by examiner

METHOD AND SYSTEM FOR METADATA EXTRACTION FOR DOCUMENT IDENTIFICATION

BACKGROUND

Subsurface exploration uses geological and geophysical methods to determine properties of materials that can be used to infer information about the subsurface of the Earth. Examples of subsurface exploration methods include seismic surveys, electromagnetic surveys, and well log data. The data generated from these subsurface exploration methods are stored in exploration documents in a database. The contents of the exploration documents are invaluable for upstream engineers to use in the planning of wellbores. However, as different subsurface exploration techniques may often be carried out by different teams and at different times, exploration documents may include different reporting styles and formats. As a result, relevant exploration documents may not be easily identifiable from a database by upstream engineers when planning a wellbore. Current methods involve manual labelling of the exploration documents with metadata to enable identification of the documents. However, manual labelling is a time-consuming and error prone process. Therefore, there is a need for a method to more accurately and efficiently capture metadata for exploration documents so they can be identified from a database and used by upstream engineers in the planning of wellbores.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method. The method includes obtaining a document comprising earth property data regarding a geological region of interest, preprocessing the document to form at least one preprocessed document, and determining, using a set of trained machine-learned models processing the at least one preprocessed document, a category of the document and a type of the document. The method further includes determining, using a natural language processing algorithm processing the at least one preprocessed document, metadata attributes of the document and a title of the document and updating a database storing the document with the title, the category, the type and the metadata attributes. The method further includes identifying, by a planning module processing a query, the document from the database based on at least one of the title, the category, the type and the metadata attributes and planning a wellbore path in the geological region of interest using the earth property data comprised in the document.

In one aspect, embodiments disclosed herein relate to a system. The system includes a machine-learned model, a machine-readable medium storing a natural language processing (NLP) algorithm; and a computer. The computer configured to obtain a document comprising earth property data regarding a geological region of interest, preprocess the document to form at least one preprocessed document, and determine, using a set of trained machine-learned models processing the at least one preprocessed document, a category of the document and a type of the document. The computer further configured to determine, using a natural language processing algorithm processing the at least one preprocessed document, metadata attributes of the document and a title of the document, and update a database storing the document with the title, the category, the type and the metadata attributes. The computer further configured to identify, by a planning module processing a query, the document from the database based on at least one of the title, the category, the type and the metadata attributes, and plan a wellbore path in the geological region of interest using the earth property data comprised in the document.

In one aspect, embodiments disclosed herein relate to a non-transitory machine-readable medium including a plurality of machine-readable instructions executed by one or more processors. The plurality of machine-readable instructions cause the one or more processors to perform a set of steps. The steps include obtaining a document comprising earth property data regarding a geological region of interest, preprocessing the document to form at least one preprocessed document, and determining, using a set of trained machine-learned models processing the at least one preprocessed document, a category of the document and a type of the document. The steps further include determining, using a natural language processing algorithm processing the at least one preprocessed document, metadata attributes of the document and a title of the document, and updating a database storing the document with the title, the category, the type and the metadata attributes. The steps further include identifying, by a planning module processing a query, the document from the database based on at least one of the title, the category, the type and the metadata attributes; and planning a wellbore path in the geological region of interest using the earth property data comprised in the document. Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
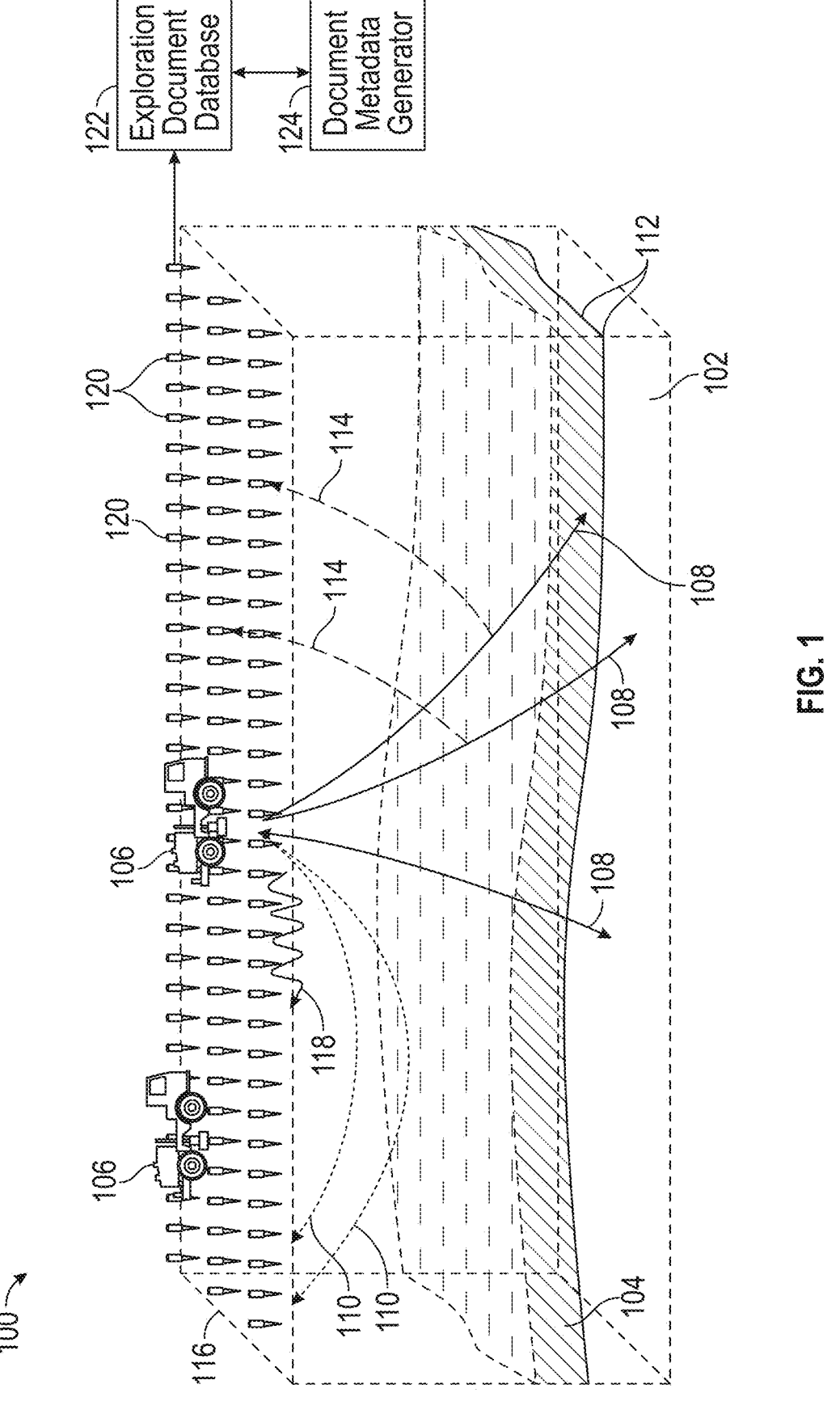
FIG. 1 depicts a seismic survey in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to a "hazard" can include reference to one or more of such hazards.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in a flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Subsurface exploration techniques generate earth property data regarding a geological region of interest. Earth properties can include, but are not limited to, the reflectivity, acoustical impedance, velocity, density, and depth to target of subsurface formations. By way of example only, FIG. 1 illustrates how a seismic survey can be used to generate earth property data to be included in an exploration document. A person of ordinary skill in the art will understand that many subsurface exploration techniques can be used to generate exploration documents containing earth property data.

FIG. 1 shows a surface seismic (SS) survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108) (i.e., emitted energy, wavefield). The type of seismic source (106) may depend on the environment in which it is used, for example on land the seismic source (106) may be a Vibroseis truck or an explosive charge, but in water the seismic source (106) may be an airgun. The radiated seismic waves (108) may return to the surface of the Earth (116) as refracted seismic waves (110) or may be reflected by geological discontinuities (112) (interfaces between subsurface regions with differing lithostratigraphic properties) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the surface of the Earth (116) and hence are not influenced, nor contain information about, portions of the subterranean region of interest (102) where hydrocarbon reservoirs (104) are typically located. Seismic receivers (120) located on or near the surface of the earth (116) detect reflected seismic waves (114), refracted seismic waves (110) and ground-roll (118).

The refracted seismic waves (110), reflected seismic waves (114), and ground-roll (118) generated by a single activation of the seismic source (106) are recorded by a seismic receiver (120) as a time-series representing the amplitude of ground-motion at a sequence of discrete sample times. Usually the origin of the time-series, denoted t=0, is determined by the activation time of the seismic source (106). This time-series may be denoted a seismic "trace". The seismic receivers (120) are positioned at a plurality of seismic receiver locations which we may denote with $(x_r, y_r)$, where x and y represent orthogonal axes on the surface of the Earth (116) above the subterranean region of interest (102). Thus, the plurality of seismic traces generated by activations of the seismic source (106) at a single location may be represented as a three-dimensional "3D" volume with axes $(x_r, y_r, t)$ where $(x_r, y_r)$ represents the location of the seismic receiver (120) and t denotes the time sample at which the amplitude of ground-motion was measured. The collection of seismic traces is herein referred to as a seismic dataset.

However, a seismic survey (100) may include recordings of seismic waves generated by a seismic source (106) sequentially activated at a plurality of seismic source locations denoted $(x_s, y_s)$. In some cases, a single seismic source (106) may be activated sequentially at each source location. In other cases, a plurality of seismic sources (106) each positioned at a different location may be activated sequentially. In some cases, a plurality of seismic sources (106) may be activated during the same time period, or during overlapping time periods.

Once acquired, a seismic dataset may undergo a myriad of pre-processing steps. These pre-processing steps may include, but are not limited to, reducing signal noise; applying move-out corrections; organizing or resampling the traces according to a regular spatial pattern (i.e., regularization); and data visualization. One with ordinary skill in the art will recognize that many pre-processing (or processing) steps exist for dealing with a seismic dataset. As such, one with ordinary skill in the art will appreciate that not all pre-processing (or processing) steps can be enumerated herein and that zero or more pre-processing (or processing) steps may be applied with the methods disclosed herein without imposing a limitation on the instant disclosure.

The seismic dataset obtained from a surface seismic (SS) survey may be processed to identify parameters associated with the region of interest (102). These parameters include the location of horizons in the region of interest, where a horizon is a plane indicating a geological formation boundary. The SS data may also be processed to identify the tops, where a top is a geological formation top (upper boundary), where a top is defined as the intersection between a horizon and a wellbore.

According to one or more embodiments, the seismic dataset and/or the identified parameters may then be included or imported into an exploration document and provided to an exploration document database (122) for storage. According to one or more embodiments, a document metadata generator (124) identifies the exploration document when it is stored in the exploration document database (122), generates metadata for the exploration document, and updates the exploration document database (122) based on the metadata.

According to one or more embodiments, the exploration document is provided to the document metadata generator (124) before being stored in the exploration document database (122), the document metadata generator (124) generates metadata for the exploration document, and then provides the metadata and the exploration document to the exploration document database (122) for storage.

While FIG. 1 illustrates the generation of an exploration document including seismic data, it will be clear to a person of ordinary skill in the art that other subsurface exploration methods can be used to generate exploration documents with any suitable earth property data. Other subsurface exploration methods include, but are not limited to, magnetic surveys, gravimetric surveys, electromagnetic surveys, logging while drilling, stratigraphic studies, or geophysical surveys.

Figure 2:
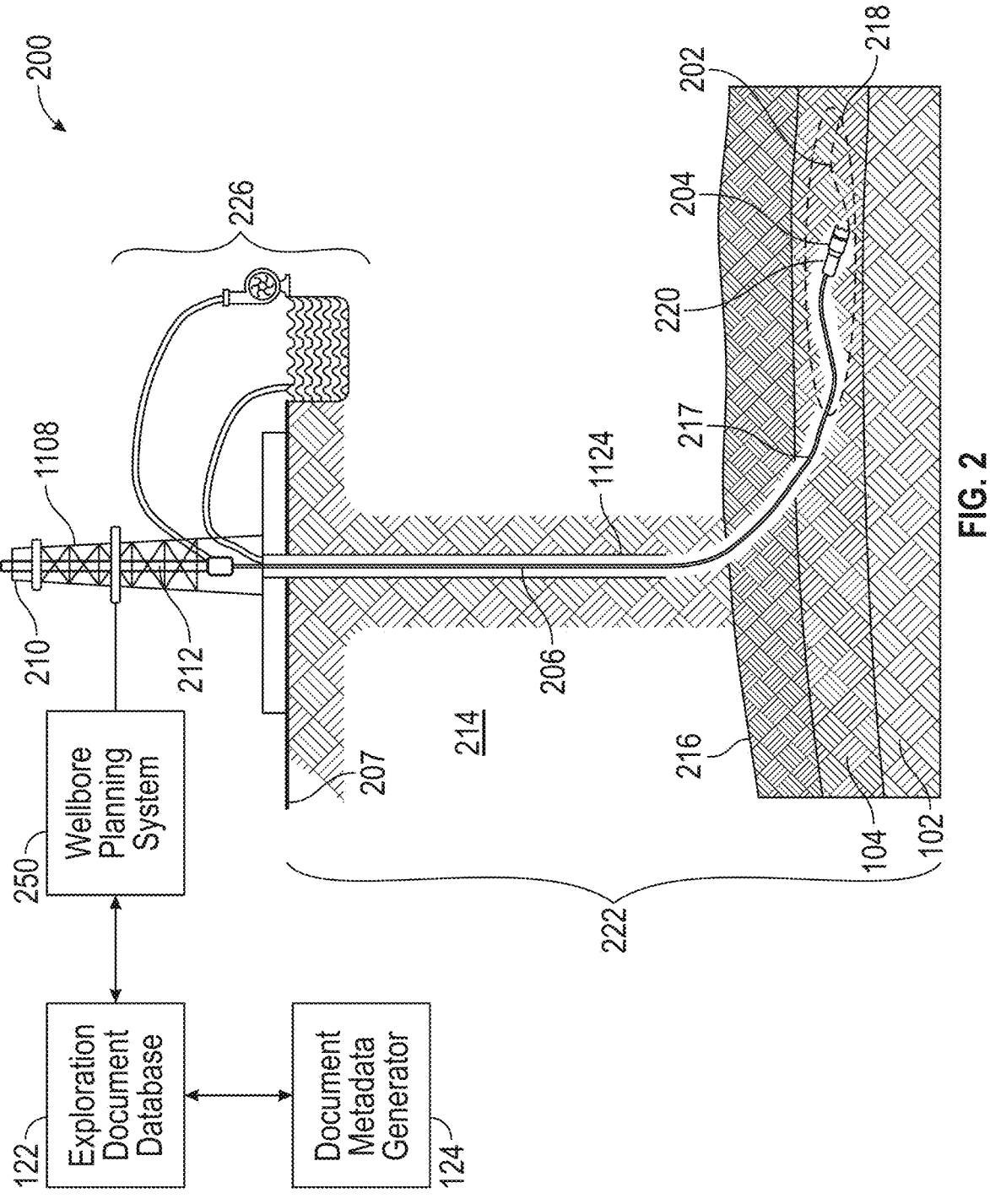
FIG. 2 depicts a drilling system in accordance with one or more embodiments.

FIG. 2 shows a drilling system (200) in accordance with one or more embodiments. Although the drilling system (200) shown in FIG. 2 is used to drill a wellbore on land, the drilling system (200) may also be a marine wellbore drilling system. The example of the drilling system (200) shown in FIG. 2 is not meant to limit the present disclosure.

As shown in FIG. 2, a wellbore path (202) may be drilled by a drill bit (204) attached by a drillstring (206) to a drill rig located on the surface (207) of the earth. The drill rig may include framework, such as a derrick (208) to hold drilling machinery. The top drive (210) sits at the top of the derrick (208) and provides torque, typically a clockwise torque, via the drive shaft (212) to the drillstring (206) in order to drill the wellbore. The wellbore may traverse a plurality of overburden (214) layers and one or more caprock (216) layers to a hydrocarbon reservoir (104) within the subterranean region of interest (102). In accordance with one or more embodiments, the field earth property dataset may be used to plan a wellbore including a wellbore path (202) and drill a wellbore (217) guided by the wellbore path (202). The wellbore path (202) may be a curved wellbore path, or a straight wellbore path. All or part of the wellbore path (202) may be vertical, and some wellbore paths may be deviated or have horizontal sections.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the target zone (218), e.g., a targeted hydrocarbon-bearing formation, and a planned wellbore path (202) from the starting location to the terminal location. In other words, the wellbore path (202) may intersect a previously located hydrocarbon reservoir (104).

Typically, the wellbore plan is generated based on best available information at the time of planning. In accordance with one or more embodiments, the wellbore plan is informed based on the data within exploration documents in the exploration document database.

The wellbore plan may include wellbore geometry information such as wellbore diameter and inclination angle. If casing (224) is used, the wellbore plan may include casing type or casing depths. Furthermore, the wellbore plan may consider other engineering constraints such as the maximum wellbore curvature ("dog-log") that the drillstring (206) may tolerate and the maximum torque and drag values that the drilling system (200) may tolerate.

A wellbore planning system (250) may be used to generate the wellbore plan. The wellbore planning system (250) may include one or more computer processors in communication with the exploration document database (122), as well as other computer memory containing other information such as information relating to drilling hazards, and the constraints imposed by the limitations of the drillstring (206) and the drilling system (200). The wellbore planning system (250) may further include dedicated software to determine the planned wellbore path (202) and associated drilling parameters, such as the planned wellbore diameter, the location of planned changes of the wellbore diameter, the planned depths at which casing (224) will be inserted to support the wellbore and to prevent formation fluids entering the wellbore, and the drilling mud weights (densities) and types that may be used during drilling the wellbore.

A wellbore (217) may be drilled using a drill rig that may be situated on a land drill site, an offshore platform, such as a jack-up rig, a semi-submersible, or a drill ship. The drill rig may be equipped with a hoisting system, such as a derrick (208), which can raise or lower the drillstring (206) and other tools required to drill the well. The drillstring (206) may include one or more drill pipes connected to form conduit and a bottom hole assembly (BHA) (220) disposed at the distal end of the drillstring (206). The BHA (220) may include a drill bit (204) to cut into subsurface (222) rock. The BHA (220) may further include measurement tools, such as a measurement-while-drilling (MWD) tool and logging-while-drilling (LWD) tool. MWD tools may include sensors and hardware to measure downhole drilling parameters, such as the azimuth and inclination of the drill bit, the weight-on-bit, and the torque. The LWD measurements may include sensors, such as resistivity, gamma ray, and neutron density sensors, to characterize the rock formation surrounding the wellbore (217). Both MWD and LWD measurements may be transmitted to the surface (207) using any suitable telemetry system, such as mud-pulse or wired-drill pipe, known in the art.

To start drilling, or "spudding in" the well, the hoisting system lowers the drillstring (206) suspended from the derrick (208) towards the planned surface location of the wellbore (217). An engine, such as a diesel engine, may be used to supply power to the top drive (210) to rotate the drillstring (206). The weight of the drillstring (206) combined with the rotational motion enables the drill bit (204) to bore the wellbore.

The near-surface is typically made up of loose or soft sediment or rock, so large diameter casing (224), e.g., "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface (207) of the earth.

Drilling may continue without any casing (224) once deeper, or more compact rock is reached. While drilling, a drilling mud system (226) may pump drilling mud from a mud tank on the surface (207) through the drill pipe. Drilling mud serves various purposes, including pressure equalization, removal of rock cuttings, and drill bit cooling and lubrication.

At planned depth intervals, drilling may be paused and the drillstring (206) withdrawn from the wellbore. Sections of casing (224) may be connected and inserted and cemented into the wellbore. Casing string may be cemented in place by pumping cement and mud, separated by a "cementing plug," from the surface (207) through the drill pipe. The cementing plug and drilling mud force the cement through the drill pipe and into the annular space between the casing and the wellbore wall. Once the cement cures, drilling may recommence. The drilling process is often performed in several stages. Therefore, the drilling and casing cycle may be repeated more than once, depending on the depth of the wellbore and the pressure on the wellbore walls from surrounding rock.

Due to the high pressures experienced by deep wellbores, a blowout preventer (BOP) may be installed at the wellhead to protect the rig and environment from unplanned oil or gas releases. As the wellbore becomes deeper, both successively smaller drill bits and casing string may be used. Drilling deviated or horizontal wellbores may require specialized drill bits or drill assemblies.

A drilling system (200) may be disposed at and communicate with other systems in the well environment. The drilling system (200) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus. Drilling may be considered complete when a target zone (218) is reached, or the presence of hydrocarbons is established.

According to one of more embodiments, the wellbore planning system (250) may receive a query. The query may be a query from a user or a query automatically generated from another section of the wellbore planning system (250). According to one or more embodiments, the query specifies a scope of a search for exploration documents.

The wellbore planning system (250) processes the query to identify a set of exploration documents from the exploration document database (122), based on a set of metadata for each document. Each document in the exploration document database (122) may contain earth property data obtained using subsurface exploration methods. The metadata for each document in the exploration document database (122) has been generated by the document metadata generator (124). The generation of the metadata for each document will be described in greater detail below. For now, it is stated that the set of metadata includes metadata attributes, a title of the document, a type of the document, and a category of the document.

The identified set of documents are returned from the exploration document database (122) and used by the wellbore planning system (250) to plan a wellbore.

Figure 3:
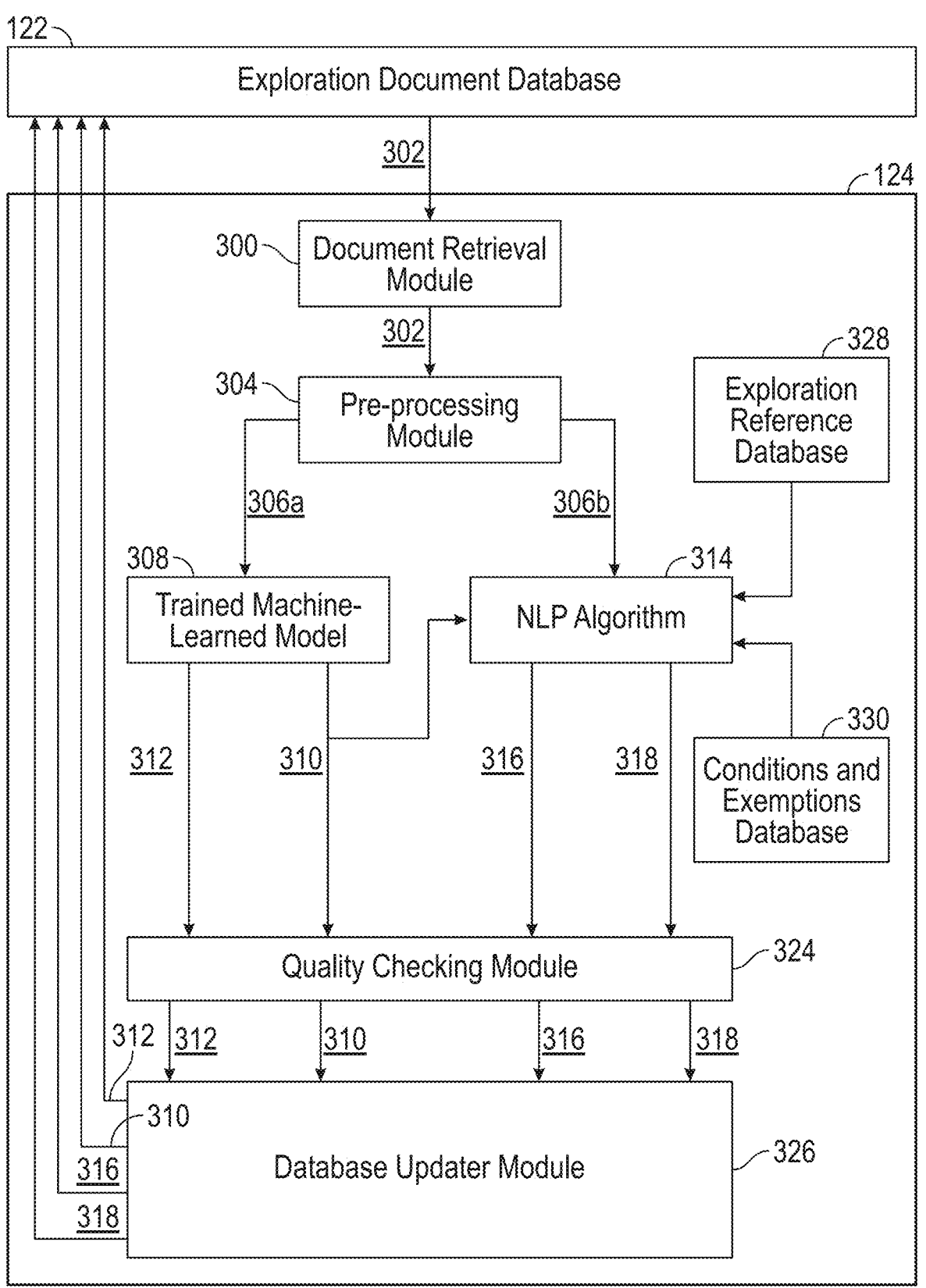
FIG. 3 depicts an overview of a document metadata generator, in accordance with one or more embodiments.

FIG. 3 depicts an overview of the document metadata generator (124), according to one or more embodiments. According to one or more embodiments, the document metadata generator (124) is a computer system or a component of a computer system. According to one or more embodiments, the document metadata generator (124) includes at least one processor and a memory storing a plurality of machine-readable instructions for execution by the at least one processor.

According to one or more embodiments, the document metadata generator (124) includes a document retrieval module (300) to identify at least one document (302) and retrieve the at least one document (302) from the exploration document database (122).

According to one or more embodiments, the at least one document (302) is provided to the document retrieval module (300) following generation of the at least one document (302) during subsurface exploration and before adding the at least one document (302) to the exploration document database (122). According to one or more embodiments, a user may input a query into the document retrieval module (300), where the query identifies documents in the database. For example, a user may specify that all documents added after a first, specific date (e.g. 1 Jan. 2023) need to be processed. According to one or more embodiments, a new exploration document added or saved to the exploration document database (122) may be automatically provided to the document retrieval module (300) as the at least one document, for example by the exploration document database (122).

According to one or more embodiments, the at least one document (302) is processed by a pre-processing module (304) to output a pre-processed document (306a, 306b). The pre-processing module (304) may be used to preform basic data cleansing or imputation to make the document (302) suitable for use with the machine-learned model (308) and the NLP algorithm (314). According to one or more embodiments, the pre-processing module (304) may pre-process the document (302) to generate a first pre-processed document (306a) for processing by the machine-learned model (308), and to generate a second pre-processed document (306b) for processing by the NLP algorithm (314). According to one or more embodiments, the first pre-processed document (306a) and the second pre-processed document (306b) are the same document.

According to one or more embodiments, the pre-processing module (304) may process the document (302) to extract raw text. The pre-processing module (304) may implement optical character recognition (OCR) or other text extraction techniques to obtain the raw text document. The pre-processing module (304) may further perform removal of stop words (such as and, to, at, for etc. . . . ) or noisy words (such as URLs).

According to one or more embodiments, the pre-processing module (304) may vectorize the document (302) prior to processing by the trained machine-learned model (308) to generate the first pre-processed document (306a). According to one or more embodiments, and discussed further below, the document (302) may be vectorized using Term Frequency-Inverse Document Frequency (TF-IDF) to generate the first pre-processed document (306a). Alternatively, according to one or more embodiments, one-hot encoding or transformers may be used to vectorize the document (302) so as to generate the first pre-processed document (306a).

One with ordinary skill in the art will recognize that many pre-processing (or processing) steps exist for dealing with a document (302). As such, one with ordinary skill in the art will appreciate that not all pre-processing (or processing) steps are enumerated herein and that zero or more pre-processing (or processing) steps may be applied with the methods disclosed herein by parsing the document (302) to extract or determine certain characteristics without imposing a limitation on the instant disclosure.

According to one or more embodiments, the first pre-processed document (306a) is processed by a trained machine-learned model (308). Details of the trained machine-learned model (308) will be provided further below, for now it is stated that the machine-learned model (308) processes the first pre-processed document (306a) to determine a category (310) of the document (302) and a type (312) of the document (302).

A category (310) is a class of subsurface exploration methods that the document belongs to. Example categories include, but are not limited to, stratigraphy, petrography, geochemistry, well pre-drill analysis and seismic.

Within each category (310), there may be a number of associated exploration methods. A type (312) is the particular subsurface exploration method that the document (302) pertains to. Example types include, but are not limited to, fission track analysis and tectonostratigraphy. For example, a document (302) may have a category (310) "geochemistry" and have a type "fission track analysis". A type (312) may be associated with more than one category (310). For example, a type (312) "tectonostratigraphy" may belong to category "Stratigraphy" or category "Structural Geology".

According to one or more embodiments, the second pre-processed document (306b) is processed by a natural language processing (NLP) algorithm (314). Details of the NLP algorithm (314) will be provided later, for now it is stated that the NLP algorithm (314) processes the second pre-processed document (306b) to determine metadata attributes (316) of the document (302) and a title (318) of the document (302). According to one or more embodiments, the NLP algorithm (314) determines the metadata attributes (316) and the title (318) of the document (302) based on the category (310).

According to one or more embodiments, the NLP algorithm (314) may determine the metadata attributes (316) and the title (318) using an exploration reference database (328) and/or a conditions and exemptions database (330). According to one or more embodiments, the document metadata generator (124) may include the exploration reference database (328) and/or the conditions and exemptions database (330). Alternatively, the exploration reference database (328) and the conditions and exemptions database (330) may not be included in the document metadata generator (124), and the document metadata generator (124) may be communicatively coupled to the exploration reference database (328) and/or the conditions and exemptions database (330), such that the document metadata generator (124) can obtain data from the exploration reference database (328) and/or the conditions and exemptions database (330).

Both the exploration reference database (328) and the conditions and exemptions database (330) will be described in greater detail below.

According to one or more embodiments, the category (310), the type (312), the metadata attributes (316) and the title (318) of the document (302) are optionally processed by a quality checking module (320). The quality checking module (324) may validate the category (310), the type (312), the metadata attributes (316) and the title (318) of the document (302) against the conditions and exemptions database (330), which is described further below. Alternatively, the quality checking module (324) may flag the document (302) and the category (310), the type (312), the metadata attributes (316) and the title (318) of the document (302) to a subject matter expert for approval or validation.

According to one or more embodiments, the subject matter expert may check the metadata attributes to ensure there are no outliers in the metadata attributes (316), for example, U-well, V-well and S-well metadata attributes outside the borehole seismic domain data category, as discussed above. According to one or more embodiments, the subject matter expert may check the metadata attributes (316) to ensure that there is no unsynchronized metadata. Unsynchronized metadata may include, for example, occurrences of field and well extractions that do not align with the discovery and spud dates. According to one or more embodiments, the subject matter expert may check the metadata attributes to ensure that there is no missing mandatory metadata. For example, some metadata attributes may be mandatory for certain categories. As an example, aquifers metadata may be a mandatory attribute for the category "Hydrology."

According to one or more embodiments, the subject matter expert may flag a document for reprocessing if the metadata attributes (316) do not meet the required quality levels.

Following approval or validation of the generated category (310), type (312), metadata attributes (316) and title (318) of the document, the category (310), the type (312), the metadata attributes (316) and the title (318) of the document (302) may then be provided to the database updater module (326). Alternatively, the category (310), the type (312), the metadata attributes (316) and the title (318) of the document (302) may be provided to the database updater module (326) without being processed by the quality checking module (324).

According to one or more embodiments, the database updater module (326) updates the exploration document database (122) with the category (310), the type (312), the metadata attributes (316) and the title (318) of the document (302). If the document (302) has not been previously stored in the exploration document database (122), the database updater module (326) may save the document (302) to the exploration document database (122).

As illustrated in FIG. 2, the wellbore planning system (250) may identify the document (302) from the exploration document database (122) based on at least one of the category (310), the type (312), the metadata attributes (316) and the title (318) of the document (302). The document (302) may then be used by the wellbore planning system (250) to plan a wellbore path in a geological region of interest using the earth property data included in the document.

Before detailing the machine-learned model (308), a cursory introduction to machine-learned models and the general principles related to training such models are provided herein. However, while descriptions of machine-learned models are provided to aid in understanding, one with ordinary skill in the art will recognize that these descriptions do not impose a limitation on the instant disclosure. This is because one with ordinary skill in the art will appreciate that, due to the depth and breadth of the field, a detailed description of the field of machine learning, and the various model types encompassed by the field, cannot be adequately summarized in the present disclosure.

Machine learning (ML), broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning (ML), or machine-learned, will be adopted herein, however, one skilled in the art will recognize that the concepts and methods detailed hereafter are not limited by this choice of nomenclature.

Machine-learned model types may include, but are not limited to, k-means, k-nearest neighbors, neural networks, logistic regression, random forests, generalized linear models, and Bayesian regression. Also, machine-learning encompasses model types that may further be categorized as "supervised", "unsupervised", "semi-supervised", or "reinforcement" models. One with ordinary skill in the art will appreciate that additional or alternate machine-learned model categorizations may be defined without departing form the scope of this disclosure. Machine-learned model types are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyperparameters surrounding a model is referred to as selecting the model "architecture." Once a machine-learned model type and hyperparameters have been selected, the machine-learned model is trained to perform a task, the performance of the machine-learned model is then evaluated, and the machine-learned model is used in a production setting (also known as deployment of the machine-learned model).

In accordance with one or more embodiments, the selected machine-learned model (308) type is a support vector machine (SVM) performing a classification to identify a category (310) and a type (312) of a document.

SVM is a machine-learning model that is trained using a supervised machine-learning algorithm. For example, a support vector machine may provide a data analysis on various input features that implement a classification and regression analysis. More specifically, a support vector machine may determine a hyperplane that separates a dataset into different classes, and also determines various points (i.e., support vectors) that lie closest to different classes. Additionally, a support vector machine may use one or more kernel functions to transform data into a desired form for further processing. The term "Kernel" may refer to a set of mathematical functions that provide the window to manipulate the input data. In other words, a kernel function may transform a training set of data so that a non-linear decision surface is able to transform to a linear equation into a higher number of dimension spaces. Examples of kernel functions may include gaussian kernel functions, gaussian kernel radial basis functions (RBFs), sigmoid kernel functions, polynomial kernel functions, and linear kernel functions.

According to one or more embodiments, the machine-learned model (308) may include a support vector machine to determine the type (312), and the category can be inferred from the type (312). For example, if the type (312) of a document is determined as being "Palynology Report", it may be determined from the Exploration Database that it belongs to the category (310) Biostratigraphy.

Alternatively, according to one or more embodiments, a first support vector machine may be used to determine the category (310) of the document, and a second support vector machine may be used to determine the type (312) of the document.

As discussed previously, prior to processing by the machine-learned model (308), the document (302) may be vectorized to generate the first pre-processed document (306a).

According to one or more embodiments, time frequency-inverse document frequency (TF-IDF) is used to vectorize the document (302). For TF-IDF, the pre-processing module (304) computes a value for each word in the document (302) to form a vectorized version of the document (or to form the pre-processed document (306a). The formula used to compute the value for each word in a document is $$TF\text{-}IDF = TF(\text{word, document}) * IDF(\text{word, document}), \qquad (1)$$

where TF is the "term frequency", which represents the number of times a word appears in the document, and IDF is the "inverse document frequency." According to one or more embodiments, TF may be $$TF(\text{word, document}) = \frac{\text{number of time a word is in the document}}{\text{total number of words in the document}}, \qquad (2)$$

According to one or more embodiments, the IDF may be $$IDF = \log\left(\frac{N}{DF(\text{word}) + 1}\right), \qquad (3)$$

where N is a number of exploration documents in the exploration database (122), and DF (word) is the occurrence of the word in all N documents. One with ordinary skill in the art will recognize that other implementations of TD-IDF are common in the literature, usually with alterations to EQ. 3. As such, it is emphasized that the implementation described herein is given as an example and does not represent a limitation on the present disclosure. The vectorized documents may be further pre-processed. For example, the vectorized documents may be normalized using any normalization technique (e.g. Manhattan norm, Euclidean norm) known in the art.

According to one or more embodiments, N in EQ. 3 includes all documents in the exploration database (122). Alternatively, N in EQ. 3 is a training set of exploration documents taken from the exploration database (122).

Alternatively, according to one or more embodiments, one-hot encoding or transformers may be used to vectorize the document (302) so as to generate the first pre-processed document (306a).

It will be clear to a person of ordinary skill in the art that the selected machine-learned model (308) type may be another machined-learned model such as naive bayes, random forests, XGBoost and logistic regression.

According to one or more embodiments, the machine-learned model (308) is trained, tested and validated using a sample set of exploration documents. Each exploration document in the sample set is labeled with a category and a type, where the category and the type are the target outputs. According to an embodiment, each exploration document in the sample set is labelled with a category included in the exploration reference database. According to an embodiment, each exploration document in the sample set is also labelled with a type. Each exploration document in the sample set is converted to a vector by the pre-processing module (304).

Figure 4:
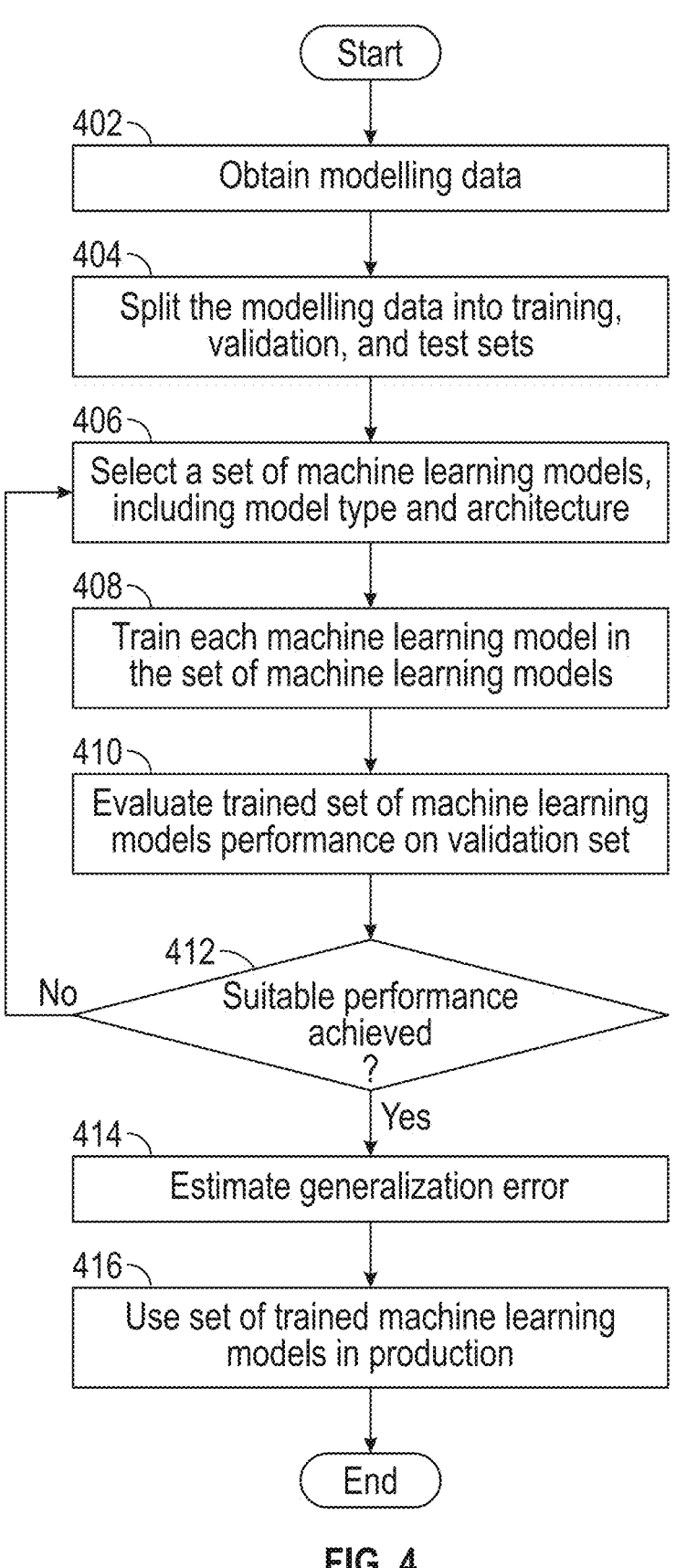
FIG. 4 depicts a flowchart in accordance with one or more embodiments.

FIG. 4 depicts a flowchart for training of the machine-learned model (308) in accordance with one or more embodiments. In Block 402, modelling data is obtained. In accordance with one or more embodiments, the modelling data consists of one or more input-target pairs, where for a given pair, the target represents the desired output of a machine-learned model operating on the input. Thus, in the context of the instant disclosure, the modelling data for the machine-learned model (308) can include the vectorized documents as the inputs and the associated category and type labels as the targets.

In Block 404, the modelling data is split into a training set, validation set, and test set. In one or more embodiments, the validation and the test set are the same such that the modelling data is effectively split into a training set and a validation/test set. In an embodiment, the training set and the validation set for the machine-learned model (308) include a subset of the vectorized documents as the input and the associated category and type labels as the targets.

In Block 406, a machine learned model (308) is selected, including a machine-learned model type (e.g., a support vector machine) and an architecture of the machine learned model. In accordance with one or more embodiments, multiple machine-learned model types and architectures are evaluated to discover the model with the best performance. In accordance with one or more embodiments, the selection of the machine-learned model type and architecture is performed by cycling through a set of user-defined models and associated architectures. In other embodiments, the machine-learned model type and architecture are selected based on the performance of previous models, for example, using a Bayesian-based search. In Block 408, the machine-learned model is trained using the training set.

The machine-learned model (308) processes an input from an input-target pair of the training data and produces an output. The output is compared to the target. During training, the machine-learned model (308) is adjusted such that the output of the machine-learned model (308) is similar to the target.

Once the machine-learned model (308) is trained, in Block 410, the input-target pairs of the validation set are processed by the trained machine-learned model (308). The output of the machine-learned model (308) is compared to the target data in the validations set. Thus, the performance of the trained machine-learned model can be evaluated.

Block 412 represents a decision. If the trained machine-learned model (308) is found to have suitable performance as evaluated on the validation set, where the criterion for suitable performance is defined by a user, then the trained machine-learned model is accepted for use on further document data. When the trained machine-learned model (308) is used on further document data, the trained machine-learned model (308) is said to be used in production. In Block 416, the trained machine-learned model (308) is used in production. However, before the machine-learned model (308) is used in production a final indication of its performance can be acquired by estimating the generalization error of the trained machine-learned model (308), as shown in Block 414. The generalization error is estimated by evaluating the performance of the trained s machine-learned model (308), after a suitable model has been found, on the test sets. One with ordinary skill in the art will recognize that the training procedure depicted in FIG. 4 is general and that many adaptions can be made without departing from the scope of the present disclosure.

Once the trained machine-learned model (308) is in production it can be used to determine a category and a type of a document.

Before detailing the NLP algorithm (314), the exploration reference database (328) and the conditions and exemptions database (330) will be described.

According to one or more embodiments, the exploration reference database (328) includes a list of exploration domain categories. For each category in the list of exploration domain categories, there is a corresponding list of attributes. The attributes may include exploration attributes and generic attributes.

TABLE 1 below illustrates an example of a portion of the exploration reference database (328) according to one or more embodiments. TABLE 1 maps each category (310) in the "Category" column to attributes (316), where the attributes (316) include exploration attributes, in the "Exploration Attributes" column, and generic attributes in the "Generic Attributes" column. In TABLE 1, for example, for a category (310) "Prospects and leads" the attributes (316) may include "Geological Age", "Exploration Well Name", and "Document Date" amongst others.

TABLE 1

| No. | Category | Exploration Attributes | Generic Attributes |
|---|---|---|---|
| 1 | Biostratigraphy | Exploration Well Name | Title |
| 2 | Petrography | Stratigraphy | Document Date |
| 3 | Sedimentology | Geological Age | Authors |
| 4 | Stratigraphy | Biozone | Proponent Name |
| 5 | Chemostratigraphy | Area Name | Proponent Code |
| 6 | Reservoir Studies | | Service Company |
| 7 | Structural Geology | | Reference Number |
| 8 | Geochemistry | | Format |
| 9 | Well Test | | Security Classification |
| 10 | Well Survey | | Longitude/Latitude |
| 11 | Competitor | | Coordinates |
| 12 | Pore Volume | | |
| 13 | Exploration Activities | | |
| 14 | Well Pre-Drill Analysis | | |
| 15 | Gravity and Magnetic | | |
| 16 | Economic Resources | | |
| 17 | Regional Petroleum System Studies | | |
| 18 | Carbon Sequestration | | |
| 19 | Petrophysical Analysis | | |

TABLE 1-continued

| No. | Category | Exploration Attributes | Generic Attributes |
|---|---|---|---|
| 20 | Well Planning and Approvals | | |
| 21 | Well Post Drill Analysis | | |
| 22 | Well Drilling Activities | | |
| 23 | Hydrology | Secondary Borehole ID | |
| | | Aquifer | |
| | | Exploration Well name | |
| | | Stratigraphy | |
| | | Geological Age | |
| | | Biozone | |
| | | Area Name | |
| 24 | Prospect and Leads | Prospect Name | |
| | | Lead Name | |
| | | Prospect ID | |
| | | Exploration Well Name | |
| | | Stratigraphy | |
| | | Geological Age | |
| | | Biozone | |
| | | Area Name | |
| 25 | Core Analysis | Core Number | |
| | | Core Test Name | |
| | | Lab Name | |
| | | Exploration Well Name | |
| | | Stratigraphy | |
| | | Geological Age | |
| | | Biozone | |
| | | Area Name | |
| 26 | Seismic | Seismic Line Name | |
| | | Seismic Line Number | |
| | | Seismic Prospect | |
| | | First Shot Point | |
| | | Last Shot Point | |
| | | Exploration Well Name | |
| | | Stratigraphy | |
| | | Geological Age | |
| | | Biozone | |
| | | Area Name | |
| 27 | Borehole Seismic | First Shot Point | |
| | | Seismic Line Number | |
| | | Exploration Well Name | |
| | | Stratigraphy | |
| | | Geological Age | |
| | | Biozone | |
| | | Area Name | |

The exploration reference database (328) may further include a list of possible values for each attribute (not shown in Table 1). For example, for the exploration attribute "geological age" the following possible values may be included in the exploration reference database: meghalayan, northgrippian, greenlandian, chibanian, calabrian, gelasian, piacenzian, santonian, Oxfordian TABLE 2 below illustrates an example of a further portion of the exploration reference database (328) according to one or more embodiments. TABLE 2 maps an attribute (316) that is mapped to a category (310) to a number of possible values. TABLE 2 illustrates the mapping of two attributes to possible values. However, it will be clear to a person of ordinary skill in the art that the exploration reference database (328) will include additional mappings, such as to map the attributes in TABLE 1 to possible values.

In TABLE 2, for example, a category (310) "Core Analysis" may be mapped to the attribute (316) "Core Test Name" (see TABLE 1 above). The attribute "Core Test Name" is in turn mapped to a number of possible values including, but not limited to, "Conventional P/P", "Whole Core", "Centrifuge Pc", "Mercury Pc", "Porous Plate Pc", and "Electrical Properties". Similarly, a category (310) "Biostratigraphy" may be mapped to the attribute (316) "Biozone" (see TABLE 1 above). The attributes "Biozone" in in turn mapped to a number of possible values including, but not limited to, "T1", "T2", "P1" etc.

According to one or more embodiments, the exploration reference database (328) may further comprise a description of each possible value.

TABLE 2

| Category | Attribute | Possible Values | Description |
|---|---|---|---|
| Core Analysis | Core Test Name | Conventional P/P | Conventional |
| | | Whole Core | Conventional |
| | | Centrifuge Pc | Capillary pressure - Centrifuge |
| | | Mercury Pc | Capillary Pressure - Mercury |
| | | Porous Plate Pc | Capillary Pressure - Porous Plate |
| | | Electrical Properties | Electrical Properties (Ambient |
| Biostratigraphy | Biozone | T1 | Triassic palyzone 1 |
| | | T2 | Triassic palyzone 2 |
| | | T3 | Triassic palyzone 3 |
| | | T4 | Triassic palyzone 4 |
| | | P1 | Permian palyzone 1 |
| | | P2 | Permian palyzone 2 |
| | | P2A | Permian palyzone 2A |
| | | P2B | Permian palyzone 2B |
| | | P3 | Permian palyzone 3 |
| | | P3A | Permian palyzone 3A |
| | | P3B | Permian palyzone 3B |
| | | P4 | Permian palyzone 4 |

TABLE 2-continued

| Category | Attribute | Possible Values | Description |
|---|---|---|---|
| | | P4A | Permian palyzone 4A |
| | | P4B | Permian palyzone 4B |
| | | P4C | Permian palyzone 4C |
| | | C1 | Caboniferous palyzone 1 |
| | | C2 | Caboniferous palyzone 2 |
| | | C3 | Caboniferous palyzone 3 |
| | | C3A | Caboniferous palyzone 3A |
| | | C3B | Caboniferous palyzone 3B |
| | | C4 | Caboniferous palyzone 4 |

According to one or more embodiments, the exploration reference database (328) may further include a list of types for each category (not shown in TABLE 1 or TABLE 2). For example, a document in the categories "Stratigraphy" or "Structural Geology" may be a Tectonostratigraphy type document.

TABLE 3 below illustrates an example of a further portion of the exploration reference database (328) according to one or more embodiments. TABLE 3 maps a category (310) to at least one document type (312). It will be clear to a person of ordinary skill in the art that the exploration reference database (328) will include additional mappings, such as to map the categories in TABLE 1 to a document type (312).

In TABLE 3, for example, a category (310) "Sedimentology" may be mapped to the types "Report: Sedimentology: Depositional Model", "Report: Studies series: Lithofacies", "Report: Studies Series: Diagenesis:", "Report: Sedimentology Operations" and "Core Description".

TABLE 3

| Category | Type |
|---|---|
| Sedimentology | Report: Sedimentology: Depositional Model |
| | Report: Studies series: Lithofacies |
| | Report: Studies Series: Diagenesis |
| | Report: Sedimentology Operations |
| | Core Description |
| Biostratigraphy | Report: Biosteering Operations |
| | Report: Micropaleontological Operations |
| | Report: Palynological Operations |
| | Report: Nannopaleontology Operations |
| | Nannopaleontology Photomicrographs |
| Seismic | 2D Survey Notes |
| | Observer Log |
| | Report: Chief Geophysicist |
| | Report: Geophysical: Seismic Processing |
| | Report: Geophysical: Microseismic |
| | Seismic Section |

According to one or more embodiments, the exploration reference database (328) includes a set of categories, corresponding types for each category in the set of categories, corresponding attributes for each category in the set of categories, and a set of corresponding possible values for each attribute.

According to one or more embodiments, the conditions and exemptions database (330) includes metadata extraction conditions and metadata extraction exceptions.

The metadata extraction conditions distinguish nomenclature that is common to multiple attributes. For example, if the extracted metadata term is "Qasim", then this term could correspond to the attributes "areas", "formations" or "wells". The metadata extraction conditions would specify that the term "Qasim" must be further qualified against the three attributes. In this way, the returned metadata term may be returned in one of the following formats:

(1) Qasim Area: Area_Name
(2) Qasim Formation: Stratigraphy_Description
(3) Qasim Well: Well_Name The metadata extraction exceptions are used to avoid false metadata extractions. For example, metadata terms V_Well (velocity well), U_Well (uphole well), or S_Well (structure well) are only relevant for domain categories "Borehole Seismic" and "Structural Geology". If these terms are identified as metadata for a document in any other category, then this would be false metadata. The metadata extraction exemptions specify metadata terms that are specific to certain categories, so as to avoid false metadata extraction.

According to one or more embodiments, the NLP algorithm (314) determines the metadata attributes (316) of a document and the title (318) of the document. It will be clear to a person of ordinary skill in the art that the NLP algorithm may include a first algorithm to determine the metadata attributes (316) and a second algorithm to determine the title (318).

Figure 5:
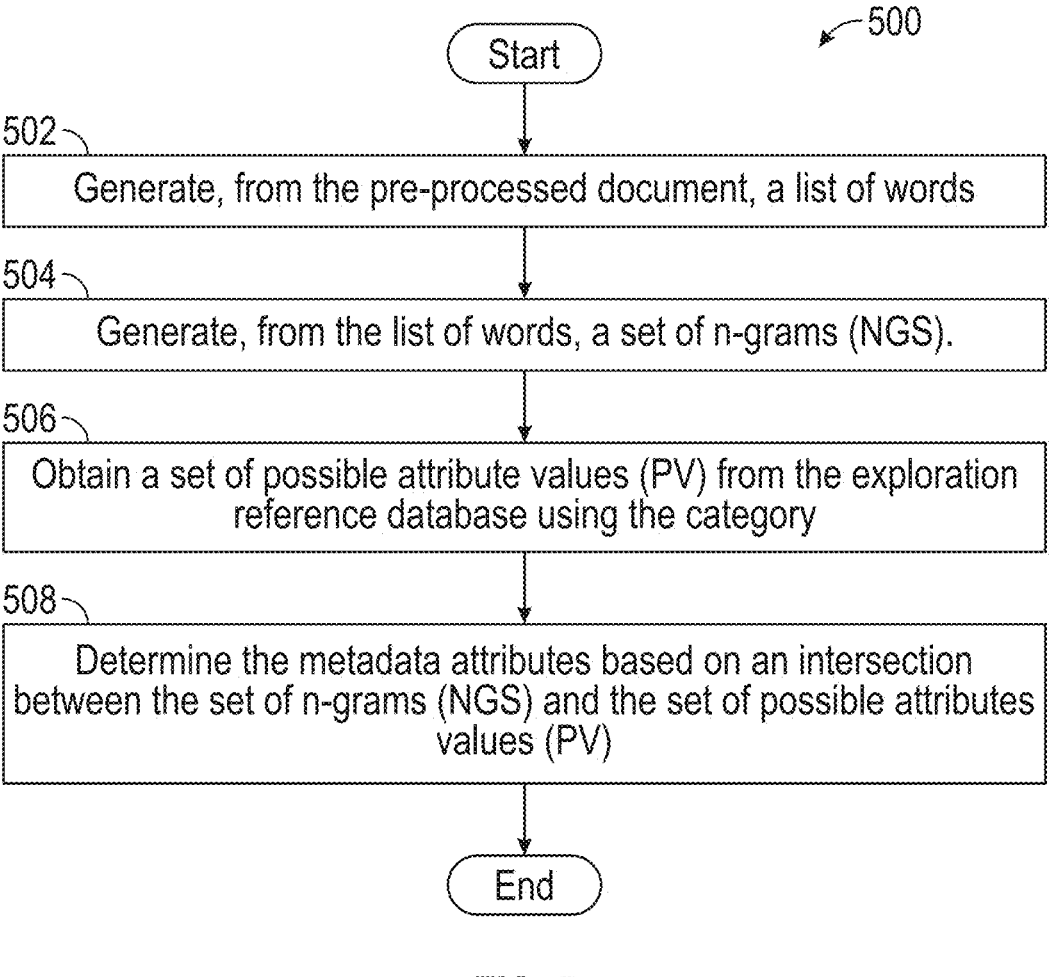
FIG. 5 depicts a flowchart in accordance with one or more embodiments.

FIG. 5 illustrates a flowchart of the process (500) implemented by the NLP algorithm (314) to determine the metadata attributes (316). According to one or more embodiments, at Block 502, the NLP algorithm (314) processes the second pre-processed document (306b) to generate a list of words (LW). A list of words (LW) is a list of all the words included in the second pre-processed document (306b).

According to one or more embodiments, the NLP algorithm (314) may reduce the list of words (LW) based on a text pattern associated with the target metadata attribute. For example, if the extraction target metadata is "well names," then it is known that well names are usually written in certain formats such as "ABCD_123". The NLP algorithm (314) may process the list of words to retain words that meet a known text pattern, or text formatting pattern.

According to one or more embodiments, at Block 504, the NLP algorithm (314) processes the list of words to obtain a set of n-grams (NGS). An n-gram is a sequence of n adjacent words or symbols in a given text. For example, for a raw text equal to "prospects and leads" and n=1, the following set of 1-grams may be determined: NGS="prospects, and, leads". For the same raw text, "prospects and leads" and n=2, the following set of 2-grams may be determined NGS="prospects and, and leads". For the same raw text, "prospects and leads", and n=3, the following set of 3-grams may be determined NGS="prospects and leads".

According to one or more embodiments, the set of n-grams may include the set of n-grams for multiple values of n. For example, the set of n-grams may include the n-grams for n=1, n=2, and n=3. For the raw text "prospects and leads", and n=1, 2, 3, the following set of n-grams may be determined: NGS="prospects, and, lead, prospects and, and leads, prospects and leads".

According to one or more embodiments, the NLP algorithm (314) may skip Block 502 and generate the set of n-grams directly from the second pre-processed document (306b) in Block 504.

According to one or more embodiments, in Block 506, the NLP algorithm (314) obtains a set of possible attribute values from the exploration reference database (328), based on the category (310) determined by the trained machine-learned model (308). According to one or more embodiments NLP algorithm (314) first identifies a set of target metadata attributes from the exploration reference database (328) for the category (310) determined by the machine-learned model (308). By way of example only, for a category (310) of "seismic", a set of target metadata attributes may be identified including, for example: Seismic Line Name, Seismic Line Number, Seismic Prospect, First Shot Point, Last Shot Point, Exploration Well Name, Stratigraphy, Geological Age, Biozone, and Area Name (see Table 1). Then, for each target metadata in the set of target metadata attributes, the NLP algorithm (314) obtains a set of possible attribute values PV associated with the target metadata attribute.

According to one or more embodiments, in Block 508, the NLP algorithm (314) then takes the intersection of the sets PV and NGS. The intersection (n) of two given sets is the set that contains all the elements that are common to both sets. The NLP algorithm (314) takes the intersection of the sets PV and NGS as the elements that are common to both PV and NGS. The intersection of the sets PV and NGS is returned as the metadata attributes (316).

An example of the operation of the NLP algorithm (314) to determine the metadata attributes (316) is given below:

A source document (302) includes an image with the embedded text "Our aim is to detect santonian and oxfordian geological ages".

The pre-processing module (304) processes the document (302) to extract the text and output a pre-processed document (306b) including raw text.

The NLP algorithm (314) converts the pre-processed document (306b) into a list of words (LW):

LW=['our','aim','is','to','detect','santonian','and','oxfordian','geological','age']

The NLP algorithm (314) converts the list of words (LW) into a list of n-grams (NGS):

NGS={'our', 'aim', 'is', 'to', 'detect', 'santonian', 'and', 'oxfordian', 'geological', 'ages', 'our aim', 'aim is', 'is to', 'to detect', 'detect santonian', 'santonian and', 'and oxfordian', 'oxfordian geological', 'geological ages', 'our aim is', 'aim is to', 'is to detect', 'to detect santonian', 'detect santonian and', 'santonian and oxfordian', 'and oxfordian geological', 'oxfordian geological ages', 'our aim is to', 'aim is to detect', 'is to detect santonian', 'to detect santonian and', 'detect santonian and oxfordian', 'santonian and oxfordian geological', 'and oxfordian geological ages'}.

As detailed previously, the machine-learned model (308) determines a category (310). In this example the category (310) may be "Prospects and Leads". Using the category (310) and the exploration reference database (328), the NLP algorithm (314) determines a set of target metadata attributes from the exploration attributes and generic attributes within the exploration reference database (328). As illustrated in Table 1, the exploration attributes for "Prospects and leads" includes geological age. Therefore, Target metadata="geological age".

For the target metadata, a set of possible values (PV) is extracted from the exploration reference database (328). For a target metadata of "geological age", the following PV set may be obtained:

PV={meghalayan, northgrippian, greenlandian, chibanian, calabrian, gelasian, piacenzian, santonian, oxfordian}

The NLP algorithm (314) then takes the intersection of the sets PV and NGS, and returns the intersection as the metadata attributes (316). The resulting metadata attributes (316) in this example would be:

Metadata attributes={'oxfordian','santonian'}

Figure 6:
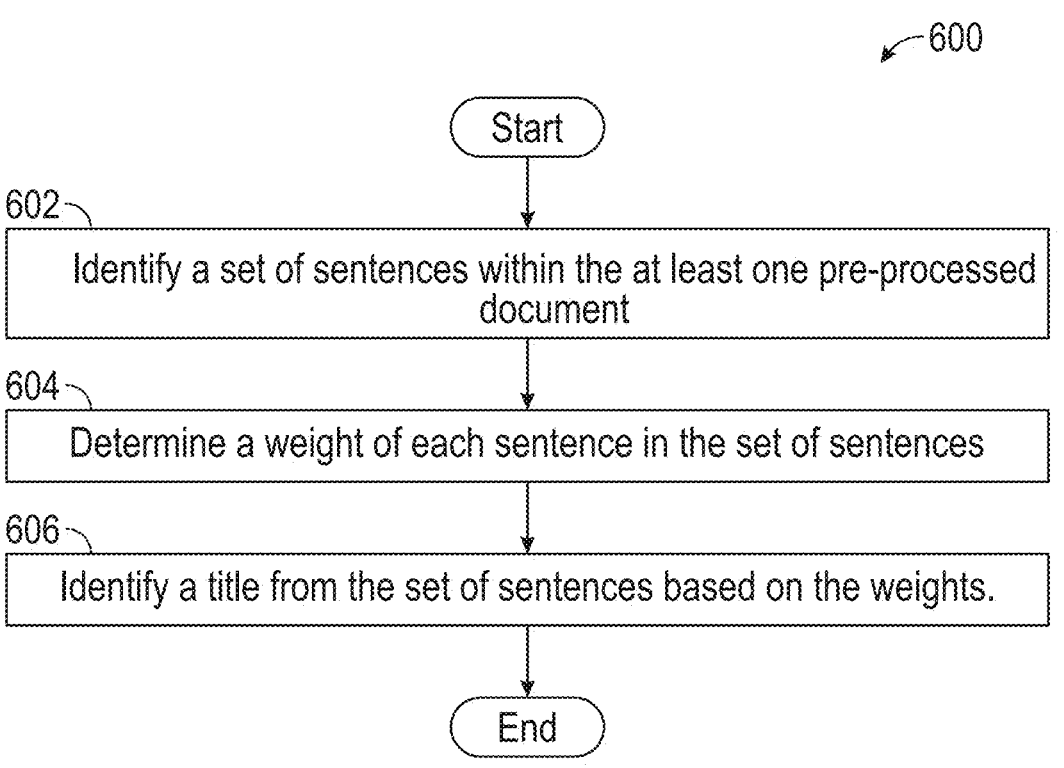
FIG. 6 depicts a flowchart in accordance with one or more embodiments.

FIG. 6 illustrates a flow chart of the process (600) implemented by the NLP algorithm (314) to determine the title (318). The NLP algorithm (314) processes the pre-processed document (306b) to determine the title (318) of the document (302). According to one or more embodiments, the NLP algorithm (314) only processes the data of the pre-processed document (306b) that corresponds to a first page of the document (302).

According to one or more embodiments, in Block 602, the NLP algorithm (314) identifies a set of sentences from the pre-processed document (306b). According to one or more embodiment, the NLP algorithm (314) determines a weight for each sentence in the set of sentences. According to one or more embodiments, the weights are determined based on a list of included and excluded words, and/or on a formatting pattern of the sentences. According to one or more embodiments, the list of words may have been defined and created by a subject matter expert and stored in a database. For example, an included word may be "summary" and an excluded word may be "confidential". For each sentence, the presence of an included word may increase the weight of the sentence, and the presence of an excluded word may decrease the weight of the sentence. Additionally, a formatting pattern, for example a capitalization pattern, may increase the weight of the sentence, while a formatting pattern, for example font of a size less than 10 pt, may decrease the weight of the sentence.

According to one or more embodiments, the NLP algorithm (314) optionally stores the sentences and their weights in an exploration dictionary.

According to one or more embodiments, in Block (606) the NLP algorithm identifies the title (318) from the set of sentences based on the weights. According to one or more embodiments, the NLP algorithm compares the weight for each sentence in the set of sentences, and returns the sentence with the highest weight as the title.

Alternatively, if the weight of the sentence with the highest weight does not meet a predetermined threshold, then the metadata attributes (316) may be returned as the title.

According to one or more embodiments, the title (318), the category (310), the type (312) and the metadata attributes (316) are processed by a quality checking module (320). The quality checking module (320) compares the title (318), the category (310), the type (312) and the metadata attributes (316) against the conditions and exemptions database (330), where the conditions and exemptions database (330) include metadata extraction conditions and metadata extraction exceptions. For example, the quality checking module (320) may identify that the returned metadata attributes (316) are in an incorrect form, or that the determined metadata attributes (316) do not apply to the determined category (310). The quality checking module (316) may determine that the title (318), the category (310), the type (312) and/or the metadata attributes (316) fail to satisfy a set of predetermined conditions and exemptions. The quality checking module (316) may then flag the document (302) for re-processing by the document metadata generator (124).

Figure 7:
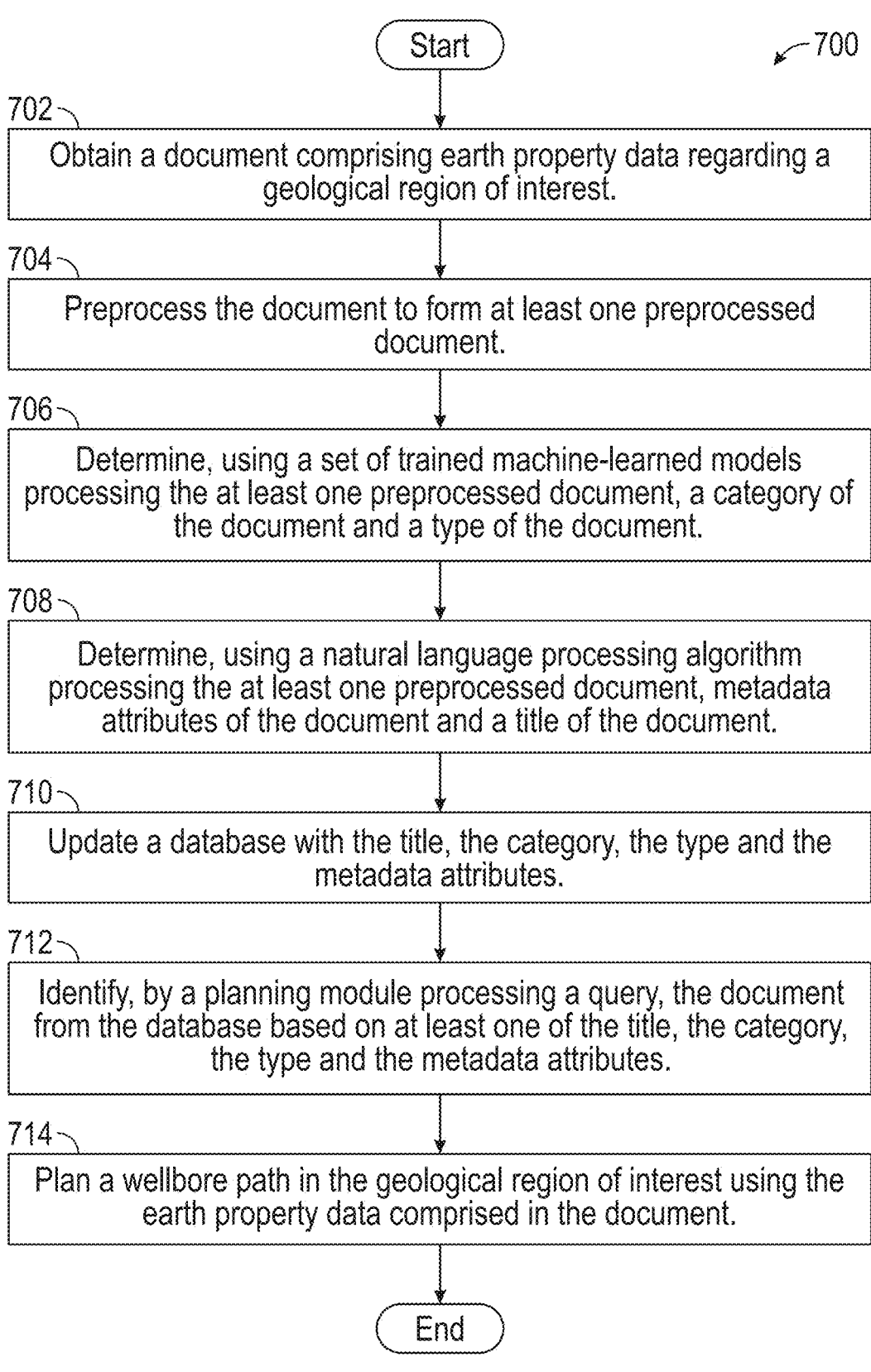
FIG. 7 depicts a flowchart in accordance with one or more embodiments.

According to one or more embodiments, when the quality checking module determines that the title, the category, the type and the metadata attributes satisfy a set of predetermined conditions and exemptions, the database storing the document is updated with the title, the category, the type and the metadata attributes, FIG. 7 depicts a flowchart outlining the method (700) according to one or more embodiments of the present disclosure. Initially, in Block 702 a document including earth property data regarding a geological region of interest is obtained. According to one or more embodiments, the document is obtained from a database. According to one or more embodiments, the document may have been generated during subsurface exploration, such as during a seismic survey, or an electromagnetic survey, and saved to the database. According to one or more embodiments, the document may be obtained following generation during subsurface exploration and before saving the document to the database. According to one or more embodiments, the document is obtained by conducting a search of the database based on a user query.

In Block 704, the document is pre-processed to form at least one preprocessed document. According to one or more embodiments, the pre-processing s may include basic data cleansing or imputation to make the document suitable for use with a machine-learned model and/or an NLP algorithm. According to one or more embodiments, the pre-processing may include optical character recognition (OCR) or other text extraction techniques to obtain a raw text document. According to one or more embodiments, the pre-processing may include vectorizing the document.

In Block 706, using a set of trained machine-learned models that are used to process the at least one preprocessed document, metadata, including a category of the document and a type of the document, are determined. Examples of a category include, but are not limited to, stratigraphy, petrography, geochemistry, well pre-drill analysis and seismic. Examples of a type include, but are not limited to fission track analysis and tectonostratigraphy. According to one or more embodiments, the set of trained machine-learned models includes at least one support vector machine.

In Block 708, using a natural language processing algorithm that is used to process the at least one preprocessed document, metadata attributes of the document and a title of the document are determined. Examples of the metadata attributes include, but are not limited to, geological age, well name, and document date.

In Block 710, a database is updated with the title, the category, the type and the metadata attributes determined for the at least one preprocessed document, where the title, the category, the type and the metadata attributes are included in the database as metadata for the original document.

In Block 712, a planning module processing a query, identifies the document including the earth property data from the database based on at least one of the title, the category, the type and the metadata attributes.

In Block 714, a wellbore path in the geological region of interest is planned using the earth property data included in the identified document. According to one or more embodiments, a starting surface location of the wellbore, or a subsurface location within an existing wellbore, from which the wellbore may be drilled may be planned using the earth property data. According to one or more embodiments, a terminal location that may intersect with a targeted hydrocarbon-bearing formation may be planned using the earth property data. According to one or more embodiments a route of the path from the starting surface to the terminal location may be planned using the earth property data. The earth property data includes information about subsurface properties and formations. Examples of the earth property data include but is not limited to, data such as reflectivity, acoustical impedance, velocity, density, and depth to target of subsurface formations. As an example only, the earth property data can be used to identify a subsurface formation, and the wellbore path may be planned to target the identified subsurface formation by planning a starting location, a terminal location and a route between them.

Figure 8:
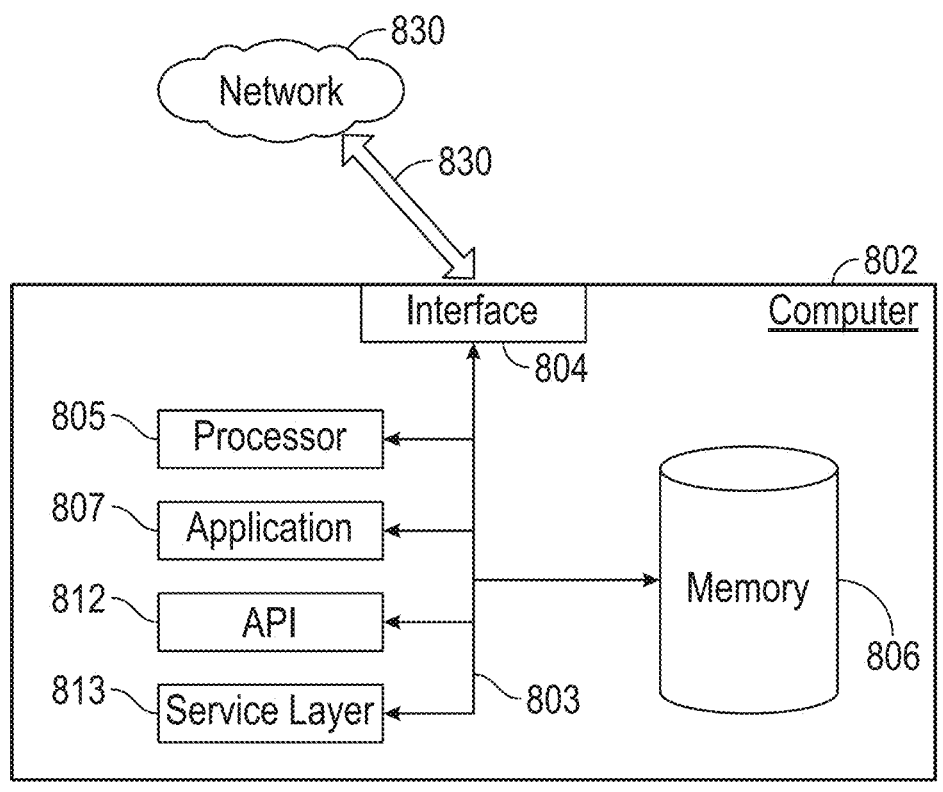
FIG. 8 depicts a system in accordance with one or more embodiments.

FIG. 8 further depicts a block diagram of a computer (802) system used to provide computational functionalities associated with the methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). The memory may be a non-transitory computer readable medium (also referred to as a non-transitory machine-readable medium). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
obtaining a document comprising earth property data regarding a geological region of interest;
preprocessing the document to form at least one preprocessed document;
determining, using a set of trained machine-learned models processing the at least one preprocessed document, a category of the document and a type of the document, wherein the category is a class of subsurface exploration methods that the document belongs to;
determining, using a natural language processing algorithm processing the at least one preprocessed document, metadata attributes of the document and a title of the document;
updating a database storing the document with the title, the category, the type and the metadata attributes;
identifying, by a planning module processing a query, the document from the database based on at least one of the title, the category, the type and the metadata attributes; and
planning a wellbore path in the geological region of interest using the earth property data comprised in the document,
wherein determining the metadata attributes of the document comprises:
generating, from the at least one preprocessed document, a set of n-grams;
obtaining from an exploration reference database, based on the category, a set of possible attributes values; and
determining the metadata attributes based on an intersection between the set of n-grams and the set of possible attributes values.

2. The method of claim 1, further comprising:
determining a location of a hydrocarbon reservoir in the geological region of interest using the earth property data; and
planning the wellbore path so as to cause a wellbore to penetrate the hydrocarbon reservoir based on the location.

3. The method of claim 1, wherein the set of trained machine-learned models comprises at least one support vector machine.

4. The method of claim 1, wherein determining the metadata attributes is further based on one of a set of metadata extraction exceptions and a set of metadata extraction conditions.

5. The method of claim 1, wherein determining the title of the document comprises:
identifying a set of sentences within the at least one preprocessed document;
determining a weight of each sentence in the set of sentences; and
identifying the title based on the weights.

6. The method of claim 5, wherein the weight is determined based on at least one of a list of included and excluded words and a formatting pattern of the sentence.

7. The method of claim 5, identifying the title based on the weights further comprises:

determining that the weight of a sentence of the set of sentences meets a predetermined criterion; and returning the sentence as the title.

8. The method of claim 5, identify the title based on the weights further comprises:

determining that the weights do not meet a predetermined criterion; and returning the metadata attributes as the title.

9. The method of claim 1, prior to updating the database storing the document with the title, the category, the type and the metadata attributes, the method further comprising:

determining, by a quality checking module that the title, the category, the type and the metadata attributes satisfy a set of predetermined conditions and exemptions.

10. A system, comprising:

a machine-learned model;

a machine-readable medium storing a natural language processing (NLP) algorithm; and a computer configured to:

obtain a document comprising earth property data regarding a geological region of interest;

preprocess the document to form at least one preprocessed document;

determine, using a set of trained machine-learned models processing the at least one preprocessed document, a category of the document and a type of the document, wherein the category is a class of subsurface exploration methods that the document belongs to;

determine, using a natural language processing algorithm processing the at least one preprocessed document, metadata attributes of the document and a title of the document;

update a database storing the document with the title, the category, the type and the metadata attributes;

identify, by a planning module processing a query, the document from the database based on at least one of the title, the category, the type and the metadata attributes; and plan a wellbore path in the geological region of interest using the earth property data comprised in the document, wherein the determine the metadata attributes of the document comprises:

generate, from the at least one preprocessed document, a set of n-grams;

obtain from an exploration reference database, based on the category, a set of possible attributes values; and determine the metadata attributes based on an intersection between the set of n-grams and the set of possible attributes values.

11. The system of claim 10, the computer further configured to:

determine a location of a hydrocarbon reservoir in the geological region of interest using the earth property data; and plan the wellbore path so as to cause a wellbore to penetrate the hydrocarbon reservoir based on the location.

12. The system of claim 10, wherein the set of trained machine-learned models comprises at least one support vector machine.

13. The system of claim 10, wherein determine the metadata attributes is further based on one of a set of metadata extraction exceptions and a set of metadata extraction conditions.

14. The system of claim 10, the computer further configured to:

identify a set of sentences within the at least one preprocessed document;

determine a weight of each sentence in the set of sentences; and identify the title based on the weights.

15. The system of claim 14, wherein the weight is determined based on at least one of a list of included and excluded words and a formatting pattern of the sentence.

16. The system of claim 14, the computer further configured to:

determine that the weight of a sentence of the set of sentences meets a predetermined criterion; and return the sentence as the title.

17. The system of claim 14, the computer further configured to:

determine that the weights do not meet a predetermined criterion; and return the metadata attributes as the title.

18. A non-transitory machine-readable medium comprising a plurality of machine-readable instructions executed by one or more processors, the plurality of machine-readable instructions causing the one or more processors to perform a method comprising:

obtaining a document comprising earth property data regarding a geological region of interest;

preprocessing the document to form at least one preprocessed document;

determining, using a set of trained machine-learned models processing the at least one preprocessed document, a category of the document and a type of the document, wherein the category is a class of subsurface exploration methods that the document belongs to;

determining, using a natural language processing algorithm processing the at least one preprocessed document, metadata attributes of the document and a title of the document;

updating a database storing the document with the title, the category, the type and the metadata attributes;

identifying, by a planning module processing a query, the document from the database based on at least one of the title, the category, the type and the metadata attributes; and planning a wellbore path in the geological region of interest using the earth property data comprised in the document wherein determining the metadata attributes of the document comprises:

generating, from the at least one preprocessed document, a set of n-grams;

obtaining from an exploration reference database, based on the category, a set of possible attributes values; and determining the metadata attributes based on an intersection between the set of n-grams and the set of possible attributes values.

* * * * *